May 8, 1945. E. P. TURNER 2,375,262
SHEEP SHEARS
Filed Jan. 3, 1944
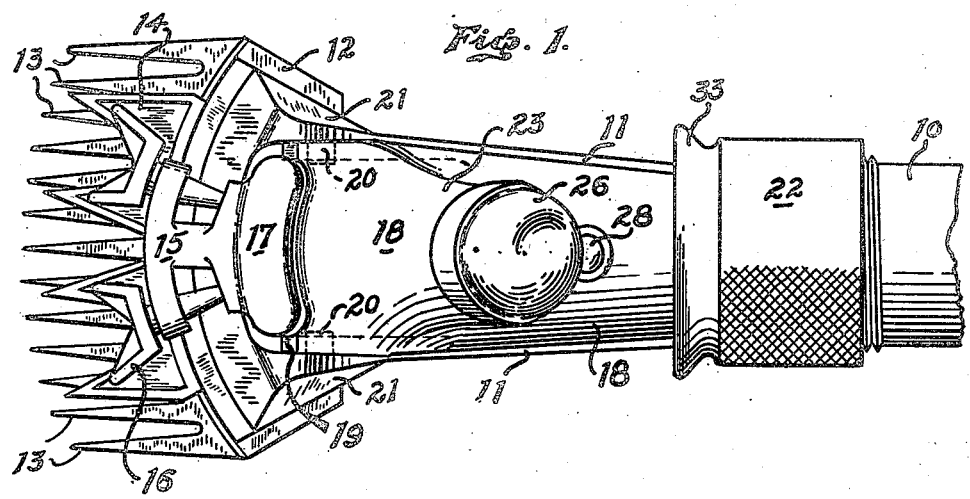
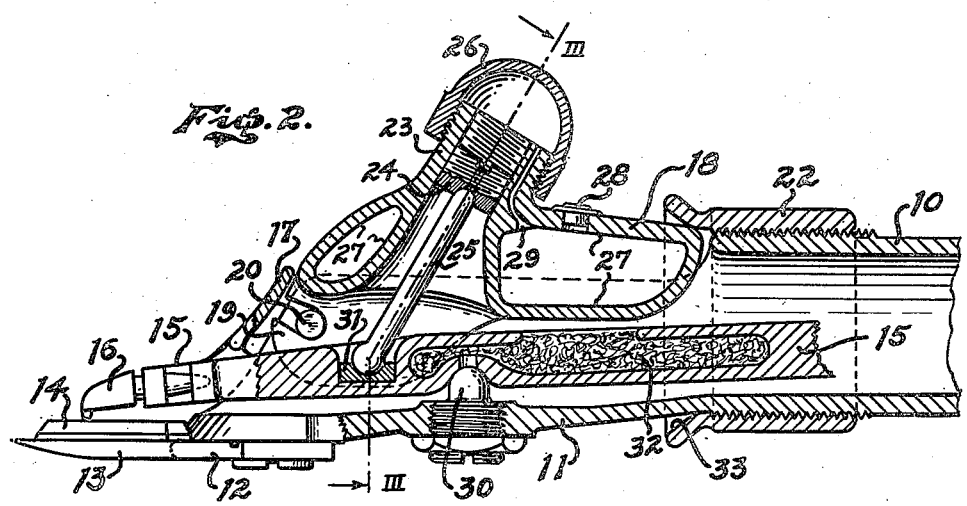
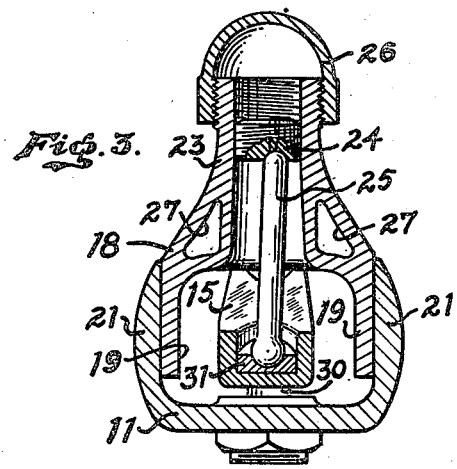
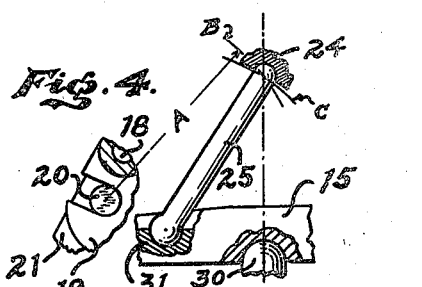
INVENTOR.
Eugene P. Turner.
BY
W. H. Atkinson
ATTORNEY.

Patented May 8, 1945

2,375,262

UNITED STATES PATENT OFFICE 2,375,262

SHEEP SHEARS

Eugene P. Turner, Sacramento, Calif.

Application January 3, 1944, Serial No. 516,813

10 Claims. (Cl. 30—222)

My present invention relates to sheep shears, and more particularly to an improvement in sheep shears of the clipper type.

An object of the invention is to provide a new and novel arrangement whereby the tension of the cutter of clipper-type shears may be adjusted in a simple, practical and efficient manner.

Another object of the invention is to provide clipper-type sheep sears in which the tension or pressure of the cutter upon the comb of the shears may be adjusted to not only vary the tension of the shears, but to also provide a tension which is substantially uniform throughout the entire sweep of the cutter over the comb.

Another object of the invention is to provide a novel tensioning arrangement for a clipper-type sheep shears by which the pressure of the cutter upon the comb may be adjusted to different values at the ends of the comb so that the shears may be equally effective in the hands of either a right or left-handed operator. Another object of the invention is to provide a new and novel type of sheep shears having parts which are readily demountable to facilitate cleaning and oiling and which has additional improved lubricating characteristics.

Other objects and advantages of the invention will be in part evident to those skilled in the art and in part pointed out hereinafter in the following description taken in connection with the accompanying drawing, wherein there is shown by way of illustration and not of limitation a preferred embodiment thereof.

In the drawing:

Figure 1 is a plan view of the wool cutting end of sheep shears constructed in accordance with the invention, Figure 2 is a partial sectional view taken along the center line of the shears as illustrated in Figure 1 of the drawing, Figure 3 is a sectional view taken along the bent section line III—III of Figure 2, looking in direction of arrows, and Figure 4 is a diagrammatic view illustrating the relatively adjustable elements involved in the invention.

As will be seen from the accompanying drawing, my present invention is particularly adapted to sheep shears of the type having an inclined dolly pin through which a downward component of force is exerted upon a cutter operating lever to produce the required pressure or shearing tension between the stationary comb of the shears and a movable cutter which oscillates over the comb. As shown in Figure 1 of the drawing, the shears, constructed in accordance with my invention, comprises a main body member having a closed grip forming portion 10 and a partially open forwardly extending portion 11 upon the under side of which a shearing comb 12 is mounted in the conventional manner. As is here clearly shown, the comb 12 has a plurality of spaced and outwardly extending tines or teeth 13 over which a cutter 14, having four blade-like projections, is adapted to move. In this arrangement the top surface of the comb 12 and the under surface of the cutter 14 are ground to provide two engaging surfaces with cutting edges at each side of the teeth 13 so that when the cutter 14 is oscillated and moves from one to the other end of the comb 12, the wool entering between the teeth 13 will be sheared off. The cutter operating lever 15 is here shown as having two diverging, pressure equalizing forks 16 extending outwardly from its end, but this feature forms no part of the present disclosure. In this figure of the drawing it will also be noted that the cutter operating lever 15 has an upwardly extending plate-like extension 17 that is adapted to direct the cut wool to one side or the other of the shears. This plate-like extension 17 also cooperates with a pivotally mounted cover-like member 18 and prevents any cut wool from entering the body portion 11 of the shears.

As is more clearly shown in Figure 2 of the drawing, the cover-like member 18 has a downwardly depending ear 19 at each side. The ears are pivotally mounted upon pivot studs 20 that extend in transversely opposed relation from the inside of cheeks 21 formed upon the forwardly extending portion 11 of the shears. At its rearward end the cover-like member 18 is shown as held against any upward pivotal movement about the pivot studs 20 by means of a knurled sleeve or collar 22 that is threaded upon the grip forming portion 10. In addition to providing a covering for the open portion 11 of the shears, the member 18 also has an upwardly extending internally threaded portion 23 in which there is adjustably mounted a cup bearing 24 into which the upper end of a dolly pin 25 is seated. This upwardly extending portion 23 also has a threaded cap 26 that serves to tightly close the cover-like member 18 at this point. As another feature, the cover-like member 18 is also cored out so as to provide a reservoir 27 which may be filled with a lubricating oil through a filling cap 28 and from which the lubricating oil may flow through a conduit 29 to the upper side of the cup bearing 24 and thence therethrough to the upper end of the dolly pin 25. In this latter figure of the drawing the cutter operating lever 15 is shown as mounted upon a main pivot 30 which is substantially in axial alignment with the upper end of the inclined dolly pin 25, and the lower end of the dolly pin 25 is shown as seated in a cup bearing 31 located upon the cutter operating lever 15 at a point forward of the main pivot 30, so that when the parts are properly adjusted, a downward component of force will be exerted upon the extending end of the operating lever 15 and thus produce a substantially uniform shearing tension or pressure between the comb 12 and the cutter 14 when the operating lever 15 is oscillated, as is well understood in the art. It will also be here noted that the cutter operating lever 15 is cored out so as to provide a recess or cavity 32 into which oil saturated waste or wool may be packed for the purpose of providing lubrication between the operating lever 15 and its main or central pivot 30. In this instance the waste or wool will be relied upon to retain a sufficient quantity of lubricating oil for an ordinary operating period, and on this point it might be said that while the conduit 29, previously described as leading from the reservoir 27 to the cup bearing 24, is shown as located at the top of the reservoir 27, it will be understood that during any normal shearing operation the shears will be moved around into many different angular positions and in many cases will be operated upside-down. This will permit the necessary flow of oil from the reservoir 27 through the conduit 29 and to the cup bearing 24 to lubricate the dolly pin 25 at both its upper and lower ends.

Upon now referring to Figure 3 of the drawing it will be noted that the ears 19 upon the cover-like member 18 are arranged to fit snugly between the cheeks 21 of the extending body portion 11 and, therefore, the pivotally mounted cover-like member 18 will be held in substantially central alignment with the longitudinal axis of the shears. A feature of the invention which is not illustrated by the arrangement shown in Figure 2 is that the cup bearing 24 may be provided with an eccentrically disposed seat into which the upper end of the dolly pin 25 extends. The purpose of a cup bearing 24 with such an eccentric seat, as is here shown, is to provide a means whereby the upper end of the dolly pin 25 may be thrown slightly out of alignment with the longitudinal center line of the shears and thus make it possible to produce either a uniform tension throughout the swinging movement of the cutter 14, and/or to provide for an increase in the shearing tension between the cutter 14 and one or the other end of the comb 12. The advantage of this feature will be appreciated when it is explained that in a normal sheep shearing operation, the comb 12 of the shears is very seldom more than three-quarters full of uncut wool. In other words, there is usually three or four tines or teeth 13 at the end of the comb 12 which are disposed over a previously cut area on the sheep and, therefore, when the shears are in use by either a right or left-handed operator, it will be desirable to so adjust the tension on the cutter 14 that the cutting operation will be most effectively accomplished at that end of the comb which is in engagement with the uncut wool. With this eccentrically adjustable feature, and the longitudinally adjustable feature provided by the swinging of the cover-like or cup bearing supporting member 18, together with the axial adjustment provided for by the screw thread mounting of the cup bearing 24, it will be seen that almost any desired distribution of the tension or pressure upon the cutter 14 may be obtained as it moves over the comb 12.

Figure 4 of the drawing diagrammatically illustrates another feature which will be found of advantage in connection with the proper tensioning of the shears. As here shown it will be noted that as the cover-like member 18 is moved clockwise about the pivot studs 20, the cup bearing 24 will be moved about a fixed radius, designated by the letter "A," the arc of which, "B," will intersect the vertical center line of the main pivot 30 and, therefore, after the cup bearing 24 is properly positioned axially within the cover-like member 18, it will be seen that the upper bearing point of the dolly pin 25 will move through an arc "C" so that it may be positioned either to the rear or forward of the vertical center line of the main pivot 30, should such a setting of the shears be found desirable. It will also be understood that this particular adjustment might be obtained by arranging the eccentricity of the cup bearing 24 along the longitudinal center line of the shears, rather than transversely thereof, as illustrated in Figure 3 of the drawing. Now, should it be desired to increase or decrease the tension between the comb 12 and the cutter 14, this can be accomplished by merely turning the knurled sleeve or collar 22 upon the grip forming portion 10 of the shears. By referring back to Figure 2 of the drawing it will be seen that the knurled sleeve or collar 22 is provided with an outwardly flaring flange or truncated conical surface 33 that is adapted to engage and secure the rearwardly extending end of the cover-like member 18 when the dolly pin 25 is placed under an operating compression.

While I have, for the sake of clearness and in order to disclose the invention so that the same can be readily understood, described and illustrated particular arrangements, I desire to have it understood that the invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In sheep shears of the character described, the combination of a main pivot, a cutter driving lever supported upon said pivot, an upwardly extending dolly pin engaging said lever at its lower end forward of said pivot, a bearing into which the upper end of said dolly pin is seated, a support for said bearing pivotally mounted on a transverse axis forward of said dolly pin, and means cooperating with the pivotal mounting of said support for securing said support against pivotal movement and holding said bearing in any desired operative position with respect to said pivot.

2. In sheep shears of the character described, the combination of a supporting pivot, an oscillatable cutter driving lever mounted upon said pivot, a rearwardly inclined dolly pin engaging said lever at its lower end forward of said pivot, a bearing located above said supporting pivot into which the upper end of said dolly pin is seated, a hinged support for said bearing, said support being hinged on a transverse axis forward of said dolly pin and adapted when hinged to carry said bearing through an arc intersecting the center line of said pivot, and means for securing said support against hinging movement and with said bearing in any desired longitudinal position with respect to the center line of said pivot.

3. In sheep shears of the character described, the combination of a vertically extending pivot, a cutter driving lever supported upon said pivot and adapted to oscillate in a substantially horizontal plane, an inclined dolly pin engaging said driving lever at its lower end forward of said pivot, a bearing support pivotally mounted on a transverse axis forward of said dolly pin, a cup bearing carried by said support into which the inclined upper end of said dolly pin is seated and adapted to be moved through an arc in a vertical plane over the axis of said pivot when said support is moved about its pivotal mounting, and means for securing said bearing support against pivotal movement and with said cup bearing in any desired operative position with respect to said pivot.

4. In sheep shears of the character described, the combination of an open-ended grip and body forming member having an upwardly projecting pivot at its open end, a cutter operating lever swingably supported by said pivot, a rearwardly inclined dolly pin engaging said lever forward of said pivot and cooperating with said pivot to exert a downward component of force upon the cutter operating end of said lever, a second member pivotally mounted upon said grip and body forming member forward of said dolly pin, a dolly pin bearing carried by said second member, said bearing being axially adjustable with respect to said dolly pin, and means for securing said second body member in a position where said dolly pin bearing after its axial adjustment will be in substantial alignment with the axis of said pivot.

5. In sheep shears of the character described, the combination of a grip forming body member having an extending portion open at its top, a vertically projecting pivot carried by said extending portion, an operating lever swingably supported by said pivot and adapted to engage a cutter at its outer end, a rearwardly inclined dolly pin engaging said operating lever forward of said pivot and adapted to exert a downward component of force upon the cutter engaging end of said lever, a second body member pivotally mounted upon said grip forming body member forward of said dolly pin and adapted to extend over the open portion thereof, an axially adjustable cup bearing carried by said second body member, and means for securing said second body member against pivotal movement with said cup bearing in cooperating relation with said pivot.

6. In sheep shears of the character described, the combination of a grip forming body member having an extending open portion forward of the grip forming portion thereof, a supporting pivot carried by said open portion, a cutter operating lever swingably supported by said pivot, a rearwardly inclined dolly pin engaging said operating lever forward of said pivot and adapted to exert a downward component of force upon the cutter engaging end of said operating lever, a second body portion pivotally mounted upon said grip forming body member and extending rearwardly over said dolly pin, a bearing member carried by said second body portion and engaging the upper end of said dolly pin, and means carried by said grip forming body member for securing said second body portion in a position where said bearing member will be held in cooperating relation with said pivot.

7. In sheep shears of the type having an oscillating cutter driving lever, the combination of a main pivot, an oscillatable cutter operating lever supported upon said pivot, a rearwardly inclined dolly pin engaging said lever between said pivot and the cutter operating end thereof, a bearing engaged by the other end of said dolly pin adjustable axially with respect thereto and normally located approximately along the center line of said pivot, a support in which said bearing is adjustably mounted, and pivotal mounting means associated with said support for positioning said bearing in alignment with the center line of said pivot independently of its axial adjustment upon said support, whereby the cutter tension exerted upon said lever by said dolly pin may be varied while maintaining the bearing engaged upper end of said dolly pin in alignment with the center line of said pivot.

8. In sheep shears of the character described, the combination of a supporting pivot, an oscillatable cutter operating lever carried by said pivot having an extending cutter engaging end, an inclined dolly pin engaging said lever forward of said pivot and adapted to exert a downward component of force upon the cutter engaging end of said lever, and a screw threaded bearing forming member adjustable axially with respect to said dolly pin, said bearing forming member having a seat for said dolly pin located eccentric to the threaded axis thereof, whereby said dolly pin may be also inclined to one side of the longitudinal axis of the shears and thereby exert a greater pressure upon said operating lever when its cutter engaging end swings to one side of said pivot.

9. In sheep shears of the character described, the combination of a supporting pivot, an oscillatable cutter operating lever carried by said pivot having a cutter engaging end, an inclined dolly pin engaging said lever forward of said pivot and adapted to exert a downward component of force upon the cutter engaging end of said lever, and a turnable bearing forming member adjustable axially along the inclined axis of said dolly pin, said bearing forming member having a seat for said dolly pin located eccentric to the axis about which it turns, whereby the upper end of said dolly pin may be positioned to one or the other side of a vertical plane extending longitudinally through the center of said pivot to thereby produce a greater pressure upon the operating end of said lever when it is moved to one side of said pivot.

10. In sheep shears of the type having an oscillating cutter driving lever, the combination of a body member, a main pivot carried by said body member, an oscillatable operating lever supported upon said pivot and having an extending cutter engaging end, a diagonally disposed dolly pin engaging said lever between said pivot and the cutter engaging end thereof, a bearing engaged by the other end of said dolly pin, a bearing support pivotally secured to said body member forward of said dolly pin in which said bearing is adjustably mounted, and means for securing said bearing support in a fixed position when in operation and permitting a complete removal of said bearing support from said body member when not in operation, whereby a changing of cutters and cleaning of the shears will be facilitated.

EUGENE P. TURNER.